US012704405B2

(12) United States Patent
Worms et al.

(10) Patent No.: US 12,704,405 B2
(45) Date of Patent: Aug. 11, 2026

(54) METHOD FOR VOLTAGE STABILIZATION OF DIODES OF A PHOTODETECTOR

(71) Applicant: Robert Bosch GmbH, Stuttgart (DE)

(72) Inventors: Kai Worms, Hardthausen Am Kocher (DE); Daniel Stricker-Shaver, Marnheim (DE); Thomas Hasenohr, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 18/943,023

(22) Filed: Nov. 11, 2024

(65) Prior Publication Data

US 2025/0164312 A1 May 22, 2025

(30) Foreign Application Priority Data

Nov. 21, 2023 (DE) ..................... 10 2023 211 566.2

(51) Int. Cl.
*G01J 1/44* (2006.01)
*G05F 1/571* (2006.01)

(52) U.S. Cl.
CPC ................ *G01J 1/44* (2013.01); *G05F 1/571* (2013.01); *G01J 2001/442* (2013.01); *G01J 2001/4433* (2013.01); *G01J 2001/444* (2013.01); *G01J 2001/4466* (2013.01)

(58) Field of Classification Search
CPC ................... G01J 1/44; G01J 2001/442; G01J 2001/4433; G01J 2001/444; G01J 2001/4466; G05F 1/571
See application file for complete search history.

(56) References Cited

U.S. PATENT DOCUMENTS

2015/0261065 A1* 9/2015 Sartor ....................... G02F 7/00 341/137
2016/0223397 A1 8/2016 Tsai et al.

FOREIGN PATENT DOCUMENTS

CN 116998164 A 11/2023
WO 2020013815 A1 1/2020
WO 2021111766 A1 6/2021

OTHER PUBLICATIONS

Zheng, et al.: "An Integrated Bias Voltage Control Method for SPAD Arrays," IEEE Photonics Technology Letters, 30 (19), (2018), pp. 1723-1726.

* cited by examiner

*Primary Examiner* — Georgia Y Epps
*Assistant Examiner* — Don J Williams
(74) *Attorney, Agent, or Firm* — Norton Rose Fulbright US LLP

(57) ABSTRACT

A method for voltage stabilization of one or more groups of single photon avalanche diodes of a photodetector, wherein a digitizer is connected downstream of each diode. The method includes: detecting one or more signals of a signal path of the photodetector, which signal path comprises the diodes and the digitizers, with the same blocking voltage applied to the diodes; ascertaining a particular amplitude spectrum of the one or more detected signals; ascertaining a particular local minimum of the ascertained amplitude spectrum or spectra; controlling the applied blocking voltage based on the ascertained local minimum or minima.

12 Claims, 5 Drawing Sheets

Fig. 5

METHOD FOR VOLTAGE STABILIZATION OF DIODES OF A PHOTODETECTOR

CROSS REFERENCE

The present application claims the benefit under 35 U.S.C. § 119 of German Patent Application No. DE 10 2023 211 566.2 filed on Nov. 21, 2023, which is expressly incorporated herein by reference in its entirety.

FIELD

The present invention relates to a method for voltage stabilization of one or more groups of single photon avalanche diodes of a photodetector, to a photodetector, to a computer program, and to a machine-readable storage medium.

BACKGROUND INFORMATION

PCT Patent Application No. WO 2021/111766 A1 describes a single-photon avalanche diode.

PCT Patent Application No. WO 2020/013815 A1 describes an avalanche diode.

SUMMARY

An object of the present invention is to provide for the efficient voltage stabilization of one or more groups of single photon avalanche diodes of a photodetector.

This object may be achieved by means of certain features of the present invention. Advantageous example embodiments of the present invention are disclosed herein.

According to a first aspect of the present invention, a method is provided for voltage stabilization of one or more groups of single photon avalanche diodes of a photodetector, wherein a digitizer is connected downstream of each of the diodes. According to an example embodiment of the present invention, the method comprises the following steps:

- detecting one or more signals of a signal path of the photodetector, which signal path comprises the diodes and the digitizers, with the same blocking voltage applied to the diodes,
- ascertaining a particular amplitude spectrum of the one or more detected signals,
- ascertaining a particular local minimum of the ascertained amplitude spectrum or spectra,
- controlling the applied blocking voltage based on the ascertained local minimum or minima.

According to a second aspect of the present invention, a photodetector is provided. According to an example embodiment of the present invention, the photodetector comprises:

- one or more groups of single photon avalanche diodes, wherein a digitizer is connected downstream of each of the diodes,
- a detection device that is configured to detect one or more signals of a signal path of the photodetector, which signal path comprises the diodes and the digitizers, with the same blocking voltage applied to the diodes,
- an ascertainment device that is configured to ascertain a particular amplitude spectrum of the one or more detected signals,
- wherein the ascertainment device is arranged to ascertain a particular local minimum of the ascertained amplitude spectrum or spectra,
- a control device that is configured to control the applied blocking voltage based on the ascertained local minimum or minima.

According to a third aspect of the present invention, a computer program is provided that comprises instructions that, when the computer program is executed by a computer, for example by the photodetector according to the second aspect, cause said computer to carry out a method according to the first aspect.

According to a fourth aspect of the present invention, a machine-readable storage medium is provided on which the computer program according to the third aspect is stored.

The present invention is based on and includes the finding that the above object may be achieved by using one or more ascertained local minima of one or more amplitude spectra to control the blocking voltage applied to the diodes. These amplitude spectra are ascertained from one or more signals of the signal path of the photodetector, wherein said signal path comprises the diodes and the digitizers.

Because the dead time of a single photon avalanche diode is highly dependent on the blocking voltage applied to the diode, the dead time can be efficiently controlled by controlling the applied blocking voltage according to the concept proposed here. This efficiently ensures that the diode can always be operated at an optimal operating point. Furthermore, a tolerance of the applied blocking voltage as well as, for example, aging effects can be compensated for effectively and advantageously. Thus, premature saturation of the photodetector can be efficiently avoided and sensitivity to small photon rates can be advantageously further increased.

This results in the technical advantage in particular that a concept for the efficient voltage stabilization of one or more groups of single photon avalanche diodes of a photodetector is provided.

The term “single photon avalanche diode” may also be abbreviated to “SPAD” in the description.

If the description refers only to a diode, it should always be understood that this is a single photon avalanche diode.

If the description refers only to a detector, it should always be understood that this is the photodetector.

If the description refers only to an amplitude spectrum, it should always be understood that it is a transformation of a time signal into the frequency domain. In order to reduce the computational effort of the transformation, for example, not all frequencies occurring in the signal can be taken into account during the transformation.

In one example embodiment of the method of the present invention, a particular digital output signal of the digitizers is time quantized using a predetermined clock to obtain a particular quantized output signal, wherein one of the quantized output signals is detected as a signal of the one or more signals of the signal path.

This provides the technical advantage that the dead time of each individual SPAD can be measured. This can be particularly advantageous if the dead time of the SPADs of a detector is subject to large scatter. SPADs with a particularly high dead time can saturate and become “blind” if the dead time exceeds a certain threshold due to an incorrectly set blocking voltage. SPADs with a particularly low dead time, on the other hand, can become insensitive to small amounts of light if the dead time falls below a certain threshold due to an incorrectly set blocking voltage. A control system that takes into account the extreme values of the measured dead times thus ensures that the largest possible number of SPADs always have optimal light sensitivity.

In one example embodiment of the method of the present invention, one of the respective digital output signals of the digitizers is detected as a signal of the one or more signals of the signal path.

This also provides the technical advantage, for example, that the dead time of each individual SPAD can be measured. However, time quantization distorts the dead time measurement. A signal path that works with a non-quantized or analog input signal is not subject to this disadvantage. However, the realization of such a signal path would be more complicated than one based on quantized signals.

In one example embodiment of the method of the present invention, a particular histogram of the quantized output signals of the one or more groups of diodes is calculated to generate a particular histogram signal representing the particular calculated histogram.

Histograms serve as a basis for measuring the reflections (="echoes") of emitted laser pulses. Therefore, histogram calculation units are a typical component of related art detectors. Therefore, no additional logic circuit needs to be implemented to calculate histograms.

In one example embodiment of the method of the present invention, one of the generated histogram signals is detected as a signal of the one or more signals of the signal path. A dead time ascertained from a histogram corresponds to the mean of the dead times of all SPADs in the group in question.

This results in the technical advantage, for example, that less logic, and thus chip area, is required to measure a mean dead time of all pixels of the detector. The disadvantage is that the distribution of dead times within the SPAD group remains unknown. It may therefore be the case that when controlling based on the dead time mean, individual SPADs with a particularly high or low dead time no longer have the optimal light sensitivity.

In one example embodiment of the method of the present invention, a mean of the generated histogram signals is ascertained to generate an averaged histogram signal representing the ascertained mean, wherein the averaged histogram signal is detected as a signal of the one or more signals of the signal path.

This results in the technical advantage, for example, that even less logic, and thus chip area, is required to calculate a mean dead time of all pixels of the detector. This method is particularly suitable for detectors of which the SPADs have a low statistical scatter of the dead time.

In one example embodiment of the method of the present invention, the averaged histogram signal to be detected is calculated only from the histogram signals of which the histogram means are similar.

The reason is that the dead time is a nonlinear function of the frequency of the first local minimum of the amplitude density spectrum and the histogram mean. If the background illumination has a significantly higher intensity in one region of the detector than in another region, the corresponding histogram mean will be very different. If the histogram mean is not included in the calculation of the dead time, this results in a measurement error. However, the dependence of the dead time on the histogram mean is so small that the histogram means of the histogram signals to be averaged can differ from each other by, for example, +/−5%. This would result in 10 dead times—one dead time for each of the 10 quantiles with a width of 10% each. The mean dead time of all SPADs of the detector is then calculated from the mean of these 10 dead times.

This provides the technical advantage, for example, that the dead time can be measured in any background light situation. The accuracy is higher compared with a measurement based on an averaged histogram signal from histograms with histogram means that differ from each other by, for example, more than +/−5%.

Histogram means that differ from each other by a maximum of a predetermined distance threshold, for example +/−x %, in particular +/−5%, are referred to as similar or are similar.

In one example embodiment of the method of the present invention, a particular mean of the generated histogram signals is ascertained to generate a particular histogram mean signal representing the particular mean of the particular histogram, wherein the generated histogram signal to be detected is selected from the generated histogram signals based on the particular histogram mean signal.

For example, histogram signals with histogram means of, for example, <2% of the maximum possible signal level are discarded.

This provides the technical advantage, for example, that when very high-intensity laser pulses occur in histogram signals with a very low histogram mean of <2% of the maximum possible signal level, no measurement of the dead time is carried out, because this can be inaccurate in such a situation.

In one example embodiment of the method of the present invention, a particular mean and a maximum value of the generated histogram signals are ascertained in order to generate a particular histogram mean signal and a histogram maximum value signal representing the particular mean and the maximum value of the particular histogram, wherein the generated histogram signal to be detected is selected from the generated histogram signals based on the particular histogram mean signal and the particular histogram maximum value signal.

This provides the technical advantage, for example, that histogram signals can be very specifically discarded in which high-intensity laser pulses occur at a very low histogram mean of <2% of the maximum possible signal level. A histogram signal in which the histogram mean is <2% of the maximum possible signal level and simultaneously the intensity of the laser pulses is comparably low can still be used for the dead time measurement.

In one example embodiment of the method of the present invention, based on the determined local minimum or minima, a particular dead time of the diode(s) is ascertained on which the signal(s) of the signal path used to ascertain the local minimum or minima was/were based, wherein the applied blocking voltage is controlled based on the respectively ascertained dead time(s).

This, for example, brings about the technical advantage that the blocking voltage can be controlled efficiently. In particular, a particularly suitable parameter, in this case the dead time, is used to control the applied blocking voltage.

Ascertaining the particular dead time can, for example, involve reading a dead time from a look-up table.

The method of the present invention is, for example, a computer-implemented method.

The method according to the first aspect is carried out of the present invention, for example, by means of the photodetector according to the second aspect of the present invention.

The photodetector according to the second aspect of the present invention is, for example, configured to carry out all the steps of the method according to the first aspect of the present invention.

The photodetector according to the second aspect of the present invention is, for example, programmed to execute the computer program.

Statements made in connection with the method of the present invention apply analogously to the photodetector of the present invention and vice versa. This means that technical functionalities and features of the method result analogously from corresponding features and technical functionalities of the photodetector and vice versa.

For example, the method of the present invention according to the first aspect explicitly comprises the step of applying an equal blocking voltage to the diodes.

A local minimum of an amplitude spectrum is, for example, the first local minimum. Further local minima are, for example, integer multiples of the first local minimum.

A local minimum is defined in particular by its frequency. Ascertaining a local minimum thus comprises in particular ascertaining a frequency of the local minimum.

Calculating a histogram of signals, for example, comprises or is an addition of the signals.

The exemplary embodiments of the present invention and embodiments of the present invention described herein can be combined with one another in any desired manner, even when this is not explicitly described.

The present invention is explained in more detail below using preferred exemplary embodiments.

BRIEF DESCRIPTION OF THE DRAWINGS

FIG. 5 shows a signal path of a photodetector, of the present invention.

DETAILED DESCRIPTION OF EXAMPLE EMBODIMENTS

Figure 1:
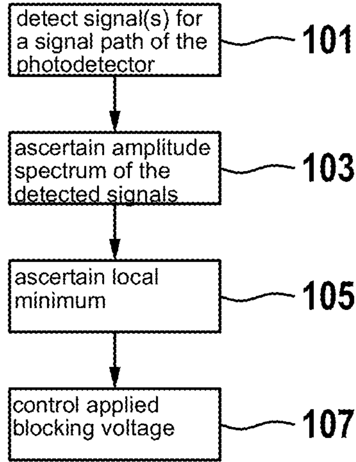
FIG. 1 shows a flow chart of a method according to the first aspect of the present invention.

FIG. 1 shows a flow chart of a method for voltage stabilization of one or more groups of single photon avalanche diodes of a photodetector, wherein a digitizer is connected downstream of each diode, the method comprising the following steps:

- detecting 101 one or more signals of a signal path of the photodetector, which signal path comprises the diodes and the digitizers, with the same blocking voltage applied to the diodes,
- ascertaining 103 a particular amplitude spectrum of the one or more detected signals,
- ascertaining 105 a particular local minimum of the ascertained amplitude spectrum or spectra,
- controlling 107 the applied blocking voltage based on the ascertained local minimum or minima.

Figure 2:
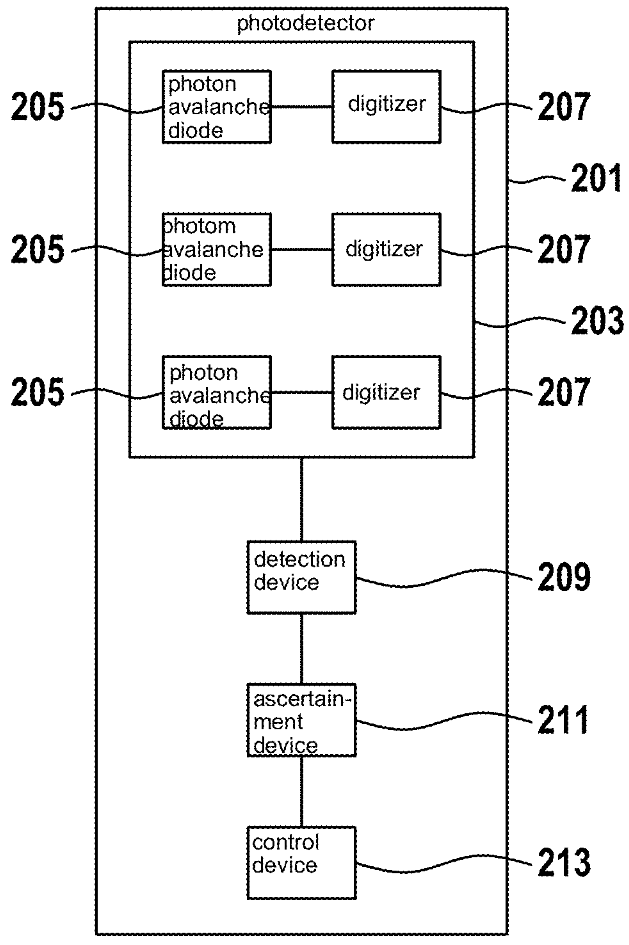
FIG. 2 shows a photodetector according to the second aspect of the present invention.

FIG. 2 shows a photodetector 201 comprising a group 203 of single photon avalanche diodes 205. A digitizer 207 is connected downstream of each single photon avalanche diode 205.

This means that output signals of the diodes 205 are digitized by the digitizer 207. The digitizers 207 thus output a digital output signal.

The photodetector 201 according to FIG. 2 shows an example of a group of single photon avalanche diodes. In an exemplary embodiment not shown, the photodetector 201 comprises a plurality of such groups of single photon avalanche diodes.

The photodetector 201 comprises a detection device 209 that is configured to detect one or more signals of a signal path of the photodetector 201, which signal path comprises the diodes 205 and the digitizers 207, with the same blocking voltage applied to the diodes 205.

The photodetector 201 comprises an ascertainment device 211 that is configured to ascertain a particular amplitude spectrum of the one or more detected signals, wherein the ascertainment device 211 is configured to ascertain a particular local minimum of the ascertained amplitude spectrum or spectra.

The photodetector 201 comprises a control device 213 that is configured to control the applied blocking voltage based on the ascertained local minimum or minima.

Figure 3:
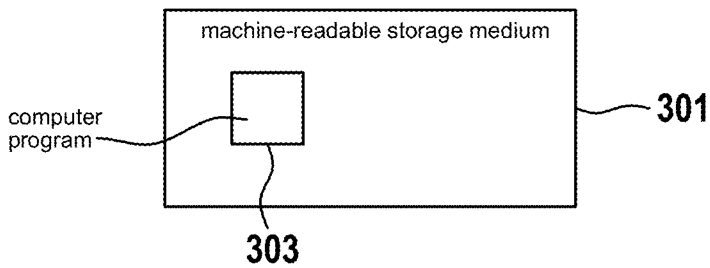
FIG. 3 shows a machine-readable storage medium according to the fourth aspect of the present invention.

FIG. 3 shows a machine-readable storage medium 301 on which a computer program 303 is stored. The computer program 303 comprises instructions which, when the computer program 303 is executed by a computer, cause the computer to carry out a method according to the first aspect.

Figure 4:
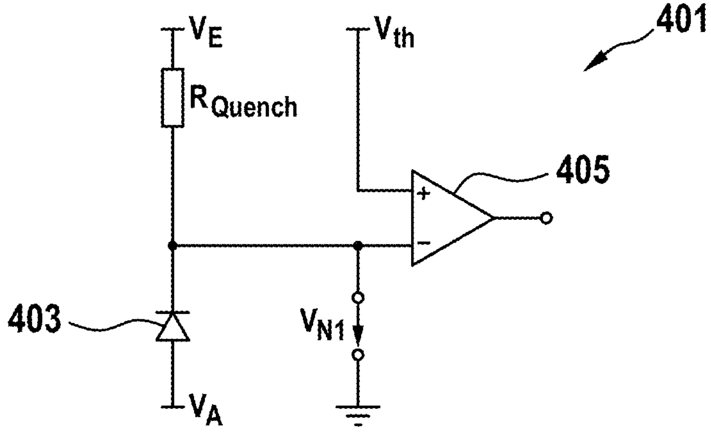
FIG. 4 shows a single photon avalanche diode of the present invention.

FIG. 4 shows a circuit diagram 401 of a single photon avalanche diode 403 and a digitizer 405 connected downstream of the diode 403. This arrangement can, for example, be comprised by a photodetector according to the second aspect. The photodetector according to the second aspect is based on single photon avalanche diodes, which can, for example, detect single photons with a sub-nanosecond time resolution. SPAD operation is characterized in particular by the fact that the diode is operated in Geiger mode. This means that the absorption of a photon triggers an avalanche of electrons, which leads to an electrically measurable signal. FIG. 4 shows an exemplary structure of a single photon avalanche diode 403 with a downstream digitizer 405. The voltage curve at the node $V_{N1}$ is digitized by the digitizer 405, which outputs a correspondingly digitized output signal. If a blocking voltage $V_A$ that is greater than a breakdown voltage $V_{BD}$ is applied via the diode 403, the absorption of a photon results in an avalanche breakdown. For the circuit shown in FIG. 4, the following applies: $V_{N1}-V_A>V_{BD}$. In the dark state, the diode is high-impedance. The node $V_{N1}$ then has the voltage $V_{N1}$=VE. If a photon triggers an avalanche breakdown, the diode becomes conductive and the potential $V_{N1}$ briefly falls to $V_{min}$=VA+VBD. At this moment the diode becomes high impedance again and the capacitances in the node $V_{N1}$ are recharged to the voltage VE by the resistor $R_{Quench}$. An electronic component with a threshold value $V_{th}$ serves as a digitizer by generating a binary pulse from this voltage drop. The state of the SPAD can be described with this signal as "breakdown" (="high") and "ready for breakdown" (="low"). The width of the pulse or the duration in the "breakdown" state is usually referred to as dead time $t_d$. The dead time $t_d$ decreases with the magnitude of the voltage VA. In addition, the probability with which a photon causes an avalanche breakdown decreases, and with it the quantum yield (PDE) of the SPAD.

Figure 5:
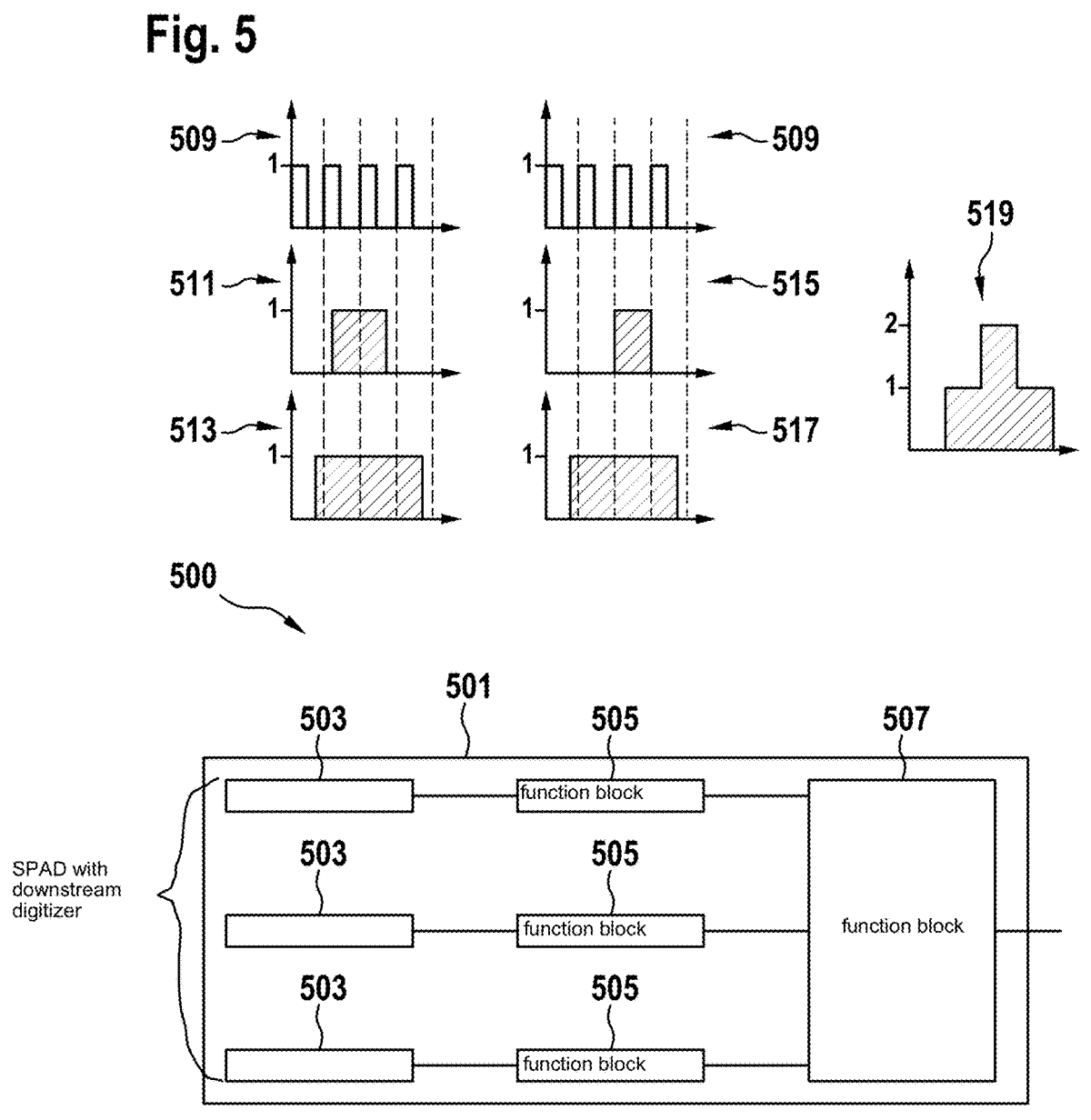

FIG. 5 shows a signal path 500 of a photodetector according to the concept described here in a simplified representation. The signal path 500 comprises a group 501 of a plurality of single photon avalanche diodes, each with a downstream digitizer. A SPAD with a downstream digitizer is symbolically represented by a square with the reference sign 503.

The digital output signals of the digitizers are time quantized according to function blocks 505. Based on the time-quantized signals, a histogram calculation is performed according to a function block 507. For example, all time-quantized signals are added together.

Furthermore, FIG. 5 shows a plurality of exemplary time curves of the individual signals or a time cycle. The time is plotted on the abscissa. The ordinate shows the amplitude of the signal or clock.

The reference sign 509 indicates a time curve of a clock, based on which the output signals of the digitizers are quantized.

The reference signs 511, 513 each point to a time curve of an output signal of a digitizer.

The reference signs 515 and 517 each point to a time curve of a time-quantized signal, which results from a time quantization of the signals according to the curves 511, 513 according to the clock shown in the curve 509.

The reference sign 519 points to a time curve of the histogram signal, which shows the calculated histogram, in this case an addition, of the two signals according to the curves 515, 517.

The following abbreviations are defined for the explanations that follow:

The digital output signals of the digitizers are denoted by $S_{SP,i}$, where i=[1 . . . . N].

$S_{TDC,i}$ denotes the time-quantized output signals.

$S_{hist}$ denotes the histogram signal that represents the calculated histogram. In particular, N SPAD pixels are grouped within a SPAD group. The digitized output signals of the SPADs i=[1 . . . . N], SSP,i are first quantized in time based on a clock. The result is the signals $S_{TDC,i}$. In the histogram calculation, for example, all signals $S_{TDC,i}$ of the SPAD group added to result in $S_{hist}=S_{TDC,1+}$ . . . $+S_{TDC,N}$. The histogram mean $\mu_{hist}$ indicates the average number of SPADs that are in the "breakdown" state and provides information about the intensity of the background lighting. Background lighting of comparably high intensity occurs, for example, when the detector is operated outdoors on a sunny day. In a SPAD-based detector, for example, the histogram is used to detect the reflections (="echoes") of emitted laser pulses.

In order to obtain the most reproducible behavior of the SPAD, the parameters PDE and dead time $t_d$ must be kept within given limits. This requires the voltage V to be set as precisely as possible$_A$. Usually $V_A=-V_{BD}$ is chosen. However, $V_{BD}$ changes with temperature, due to manufacturing tolerances from SPAD to SPAD and due to aging. In the current related art, after the production of a SPAD-based detector, $V_{BD}$ is measured depending on the temperature and stored for use in the product. However, aging effects cannot be taken into account with this method. In addition, the voltage $V_A$ generated in the photodetector is subject to a tolerance that, in combination with aging effects, can lead to the dead time $t_d$ and the PDE changes over too wide a range. For the photodetector, this can mean that if the voltage $|V_A|$ is too high, the dead time $t_d$ and the PDE increase to such an extent that the detector reaches saturation at a certain photon rate and thus becomes "blind." If the voltage $|V_A|$ is too low, the PDE can be reduced to such an extent that small amounts of light can no longer be detected.

Controlling the voltage $V_A$ based on the measurement of the dead time $t_d$ ensures that the SPAD is always operated at the optimal operating point. The tolerance of the generated voltage $V_A$, aging effects and variation from SPAD to SPAD can thus be effectively compensated for. Thus, premature saturation of the photodetector can be avoided and sensitivity to small photon rates can be increased.

Thus, the dead time $t_d$ is thus highly dependent on the blocking voltage $V_A$. This property is used in the context of the concept described here to control the blocking voltage $V_A$ based on a value that depends on the dead time $t_d$: the minimum or minima of the amplitude spectra used here.

Figure 6:
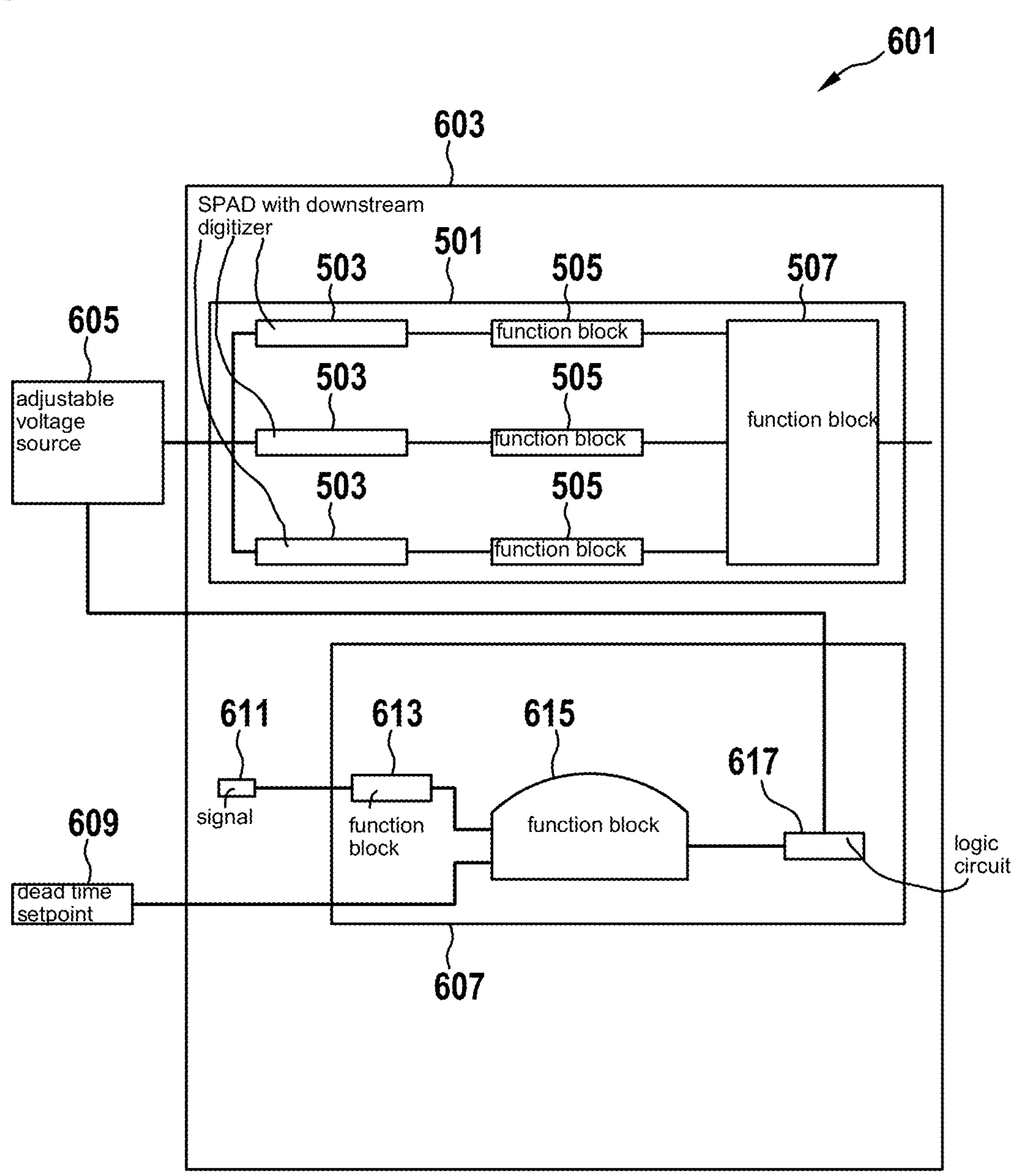
FIG. 6 shows a first block diagram according to an example embodiment of the present invention.

FIG. 6 shows a first block diagram 601, according to which the concept described here is explained in more detail by way of example using a photodetector 603 according to the second aspect having an exemplary control device 607.

The diodes are supplied with an equal blocking voltage by an adjustable voltage source 605. This means that an equal blocking voltage is applied to the diodes by means of the adjustable voltage source 605.

It is noted that the control device 607 can be implemented in whole or in part in the hardware of the photodetector.

A dead time setpoint is provided to the control device 607 as an input. This setpoint is symbolically identified by a block with the reference sign 609. The dead time setpoint can also be denoted by $T_{d,setpoint}$.

Furthermore, the control device 607 receives a signal 611 of the signal path, for example $S_{TDC,i,j}$, as an input variable, where j ranges from 1 to M and denotes the index of one of the groups of single photon avalanche diodes of the photodetector 603. $S_{hist,j}$ can also be used as an input variable 611.

According to a function block 613, the dead time is calculated based on the input variable 611. A deviation $\Delta V_A$ from the ideal voltage $V_a$ can be calculated from the calculated dead time $t_d$ and the setpoint $t_{d,\ setpoint}$ according to a function block 615. A logic circuit 617 then regulates the adjustable voltage source 605 so that the deviation $\Delta V_a$ is minimized.

Therefore, all SPAD groups are supplied with a single voltage $V_A$. The controller uses either the time-quantized signals $S_{TDC,i,j}$ or the histograms $S_{hist,j}$. The following applies: i∈[1 . . . . N] and j∈[1 . . . M]. A dead time scalar $t_d$ can be calculated from one or more signals. When selecting the signals, for example, it is taken into account that the dead time $t_d$ of each SPAD pixel may vary due to manufacturing tolerances.

For example, a dead time is calculated based on a local minimum of an amplitude spectrum of the corresponding signal.

For example, the deviation $\Delta V_a$ from the ideal voltage $V_a$ is calculated from the calculated dead time $t_d$ and its setpoint $t_{d,setpoint}$. For example, a logic circuit controls the adjustable voltage source so that the deviation $\Delta V_a$ is minimized.

Figure 7:
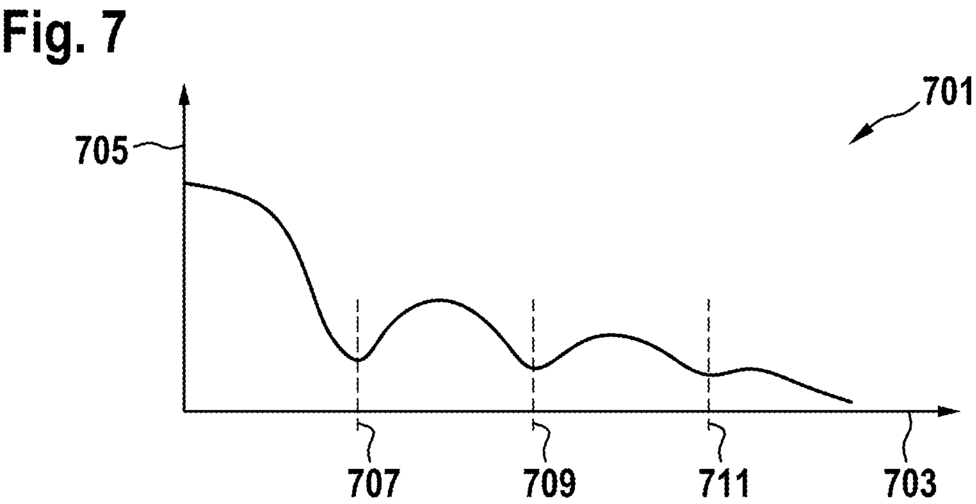
FIG. 7 shows an amplitude spectrum according to an example embodiment of the present invention.

An amplitude spectrum 701 can be calculated from each of the signals $S_{SP,i}$, $S_{TDC,i}$ or $S_{hist}$, which is shown by way of example in FIG. 7.

The frequency of the signal of the signal path is plotted on the abscissa 703. The amplitude of the signal of the signal path is plotted on the ordinate 705.

The reference signs 707, 709, 711 designate a plurality of local minima of the amplitude spectrum 701.

The first local minimum is identified by the reference sign 707. The second local minimum of the amplitude spectrum is identified by the reference sign 709. The third local minimum is identified by the reference sign 711.

The first local minimum 707 can also be denoted by $f_d$. The other local minima 709, 711 are located at integer multiples of $f_d$.

The special feature of the amplitude spectrum 701 is that for a given detector the frequency $f_d$ of the first local minimum depends significantly on the dead time $t_d$ and only slightly on the mean of the particular signal $S_{SP,i}$, $S_{TDC,i}$ or $S_{hist}$. Further local minima are located at integer multiples of $f_d$.

In situations with a very low background light intensity and simultaneously high intensity due to incoming laser pulses, the relationship between the mean and the frequency of the local minimum at the dead time $t_d$ is too complicated to implement a corresponding evaluation in the detector logic circuit. To avoid resulting measurement errors, for example, the signals $S_{SP,i}$, $S_{TDC,i}$ or $S_{hist}$ are filtered out of the aforementioned situation. For example, the fact that the ratio of the laser pulse duration to the measurement time represented by the signals $S_{SP,i}$, $S_{TDC,i}$ or $S_{hist}$ is only approximately 1 to 100 is exploited for this purpose. Thus, the laser pulses have only a negligible influence on the mean. A very simple filter, for example, is based on the fact that the signals $S_{SP,i}$, $S_{TDC,i}$ or $S_{hist}$ with a mean of <2% of the maximum possible signal level are discarded. For example, high-intensity laser pulses are detected based on maximum values in the signals $S_{SP,i}$, $S_{TDC,i}$ or $S_{hist}$. Signals are detected in which maximum values close to the maximum possible signal level and very low means occur simultaneously, wherein such signals are, for example, discarded.

In the following, it is assumed that the signal $S_{hist,j}$ of the SPAD group j with the mean $\mu_{hist,j}$ is used as the basis for calculating the dead time.

Figure 8:
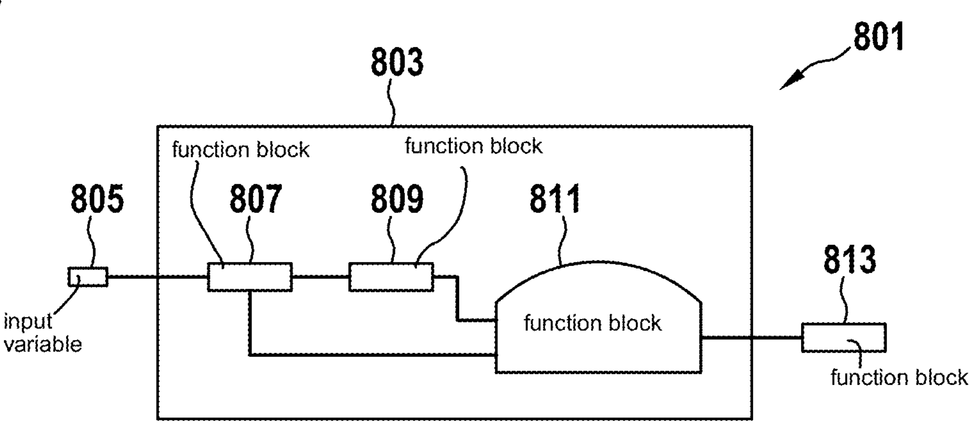
FIG. 8 shows a second block diagram according to an example embodiment of the present invention.

The method for calculating the dead time $t_d$ is shown by way of example in FIG. 8.

FIG. 8 shows a second block diagram 801, which illustrates an exemplary calculation of a dead time $t_d$.

A unit 803 for calculating the dead time $t_d$ receives the signal or signals $S_{hist,j}$ as an input variable 805 by way of example. According to a function block 807, one of the signals 805 is selected, for example, based on the mean. The mean of the histogram of which the histogram signal is used to ascertain the amplitude spectrum and ultimately to ascertain the local minimum is referred to as $\mu_{hist}$ and is provided as an input variable to a function block 811. According to a function block 809, an amplitude spectrum of the selected signal is ascertained and the frequency $f_d$ is ascertained. This is provided to the function block 811 as an input variable, according to which function block the dead time $t_d$ 813 is ascertained or calculated based on the mean $\mu_{hist}$ and $f_d$.

For example, to calculate the amplitude spectrum, only the histograms are used of which the means $\mu_{hist,j}$ are similar. This is achieved, for example, by selecting the appropriate histograms.

The frequencies $f_d$, $2f_d$, $3f_d$ . . . can be found by searching for local minima. The minima search becomes particularly robust if a model function is previously fitted to the amplitude spectrum.

The relation $f_d=F(t_d, \mu_{hist})$ is determined, for example, by directly measuring the dead time $t_d$, for example, and on the other hand the frequency $f_d$ for different means $\mu_{hist}$ is ascertained. The relation $f_d=F(t_d, \mu_{hist})$ can be implemented, for example, as a look-up table or as a fit function. The reverse relation $t_d=F(f_d, \mu_{hist})$ can now be used during operation of the photodetector to determine the dead time $t_d$ from the frequency $f_d$ and the histogram mean $\mu_{hist}$.

An exemplary embodiment of the control consists, for example, in calculating the deviation $\Delta V_a$ from the measured dead time $t_d$ and the setpoint $t_{d,\ setpoint}$ according to FIG. 6, which deviation is needed to reach the setpoint $t_{d,\ setpoint}$. For this purpose, the relation $\Delta V_a=F(t_d, t_{d,\ setpoint})$ is used, which can be ascertained, for example, by means of a characterization.

A logic circuit regulates the target voltage $V_{A,\ Setpoint}$ of the adjustable voltage source with the aim of bringing $\Delta V_a$ as close to 0 as possible.

Figure 9:
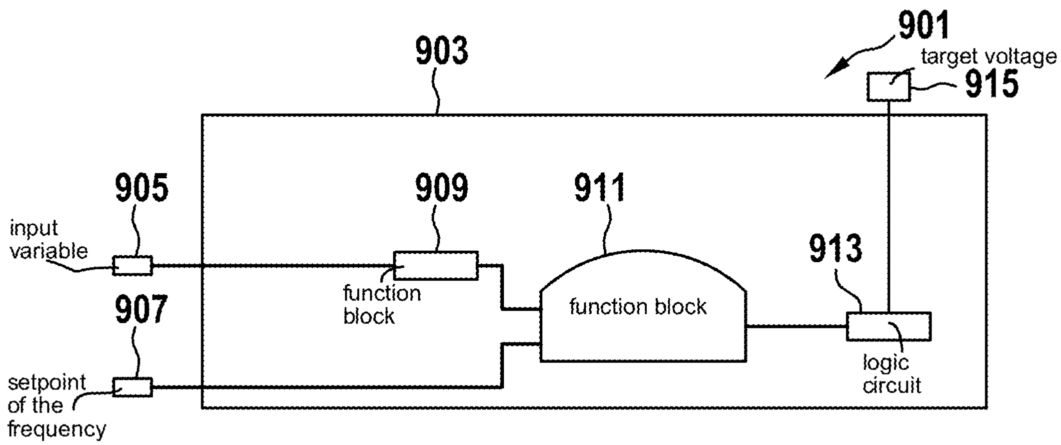
FIG. 9 shows a third block diagram according to an example embodiment of the present invention.

In the embodiment shown in FIG. 9, the calculation of the dead time $t_d$ is dispensed with. Only the frequency $f_d$ is ascertained from an amplitude spectrum, as shown by way of example in FIG. 7. An error variable $A_{err}$ is calculated from the relation $A_{err}=F(f_d, f_{d,\ setpoint})$, for example, to $A_{err}=B(f_{d,\ max}-f_{d,\ setpoint})$ with B as a constant. A logic circuit regulates the target voltage $V_{A,\ Setpoint}$ of the adjustable voltage source then with the target $A_{err}=0$.

The setpoint of the frequency $f_{d,\ setpoint}$ can be selected based on a strategy that does not only or not at all pursue the goal of reaching a certain dead time setpoint $t_{d,\ setpoint}$. A prerequisite is a pre-characterization of the SPAD-based detector, in which $f_d$ is determined depending on corresponding parameters such as PDE, $V_a$, or temperature. This allows, for example, the following control strategies, which can be combined with each other, in particular partially:

1. Achieving the maximum possible PDE.
2. Achieving a constant PDE within a given temperature range.
3. Operating the photodetector at operating points defined by the voltage VBD given in the new state.

Thus, FIG. 9 shows a third block diagram 901, which shows an exemplary control of the applied blocking voltage $V_a$ based on the frequency $f_d$.

A logic circuit 903 receives, for example, the signal $S_{hist}$ as an input variable 905 to determine the deviation $\Delta V_a$. The setpoint of the frequency $f_{d,\ setpoint}$ 907 is used as another input variable. Based on $S_{hist}$, the frequency $f_d$, i.e. the frequency of the first local minimum, is calculated according to a function block 909. The frequency $f_d$ is used as an input variable for a function block 911, which also receives the setpoint of the frequency $f_{d,\ setpoint}$ 907.

The error variable $A_{err}$ can be defined as follows: $A_{err}=F(f_d, f_{d,\ setpoint})$.

The error variable is made available to a logic circuit 913 as an input variable, which, based on this, outputs a target voltage 915 to the adjustable voltage source, with the target of $A_{err}=0$.

What is claimed is:

1. A method for voltage stabilization of one or more groups of single photon avalanche diodes of a photodetector, wherein a digitizer is connected downstream of each of the diodes, the method comprising the following steps:

detecting one or more signals of a signal path of the photodetector, the signal path including the diodes and the digitizers, with the same blocking voltage applied to the diodes;

ascertaining a respective amplitude spectrum of each of the one or more detected signals;

ascertaining a respective local minimum of each of the ascertained respective amplitude spectrum of each of the one or more detected signals;

controlling the applied blocking voltage based on the ascertained respective local minimum or minima.

2. The method according to claim 1, wherein a particular digital output signal of the digitizers is time quantized using a predetermined clock to obtain a particular quantized output signal, wherein one of the quantized output signals is detected as a signal of the one or more signals of the signal path.

3. The method according to claim 1, wherein a respective histogram of the quantized output signals of each of the one or more groups of diodes is calculated to generate a respective histogram signal representing the respective calculated histogram.

4. The method according to claim 3, wherein one of the generated histogram signals is detected as a signal of the one or more signals of the signal path.

5. The method according to claim 4, wherein a respective mean of the generated histogram signals is ascertained to generate each respective histogram mean signal representing the respective mean of the respective histogram, wherein the generated respective histogram signal to be detected is selected from the generated histogram signals based on an averaged histogram mean signal.

6. The method according to claim 5, wherein the generated histogram signal to be detected is calculated from the respective histogram signals of which the respective histogram means are similar.

7. The method according to claim 4, wherein a respective mean and a respective maximum value of each of the generated respective histogram signals are ascertained in order to generate a respective histogram mean signal and a respective maximum value signal representing the respective mean and the respective maximum value of the respective histogram, wherein the generated respective histogram signal to be detected is selected from the generated respective histogram signals based on the particular histogram mean signal and the respective histogram maximum value signal.

8. The method according to claim 3, wherein a mean of the generated histogram signals is ascertained to generate an averaged histogram signal representing the ascertained mean, wherein the averaged histogram signal is detected as a signal of the one or more signals of the signal path.

9. The method according to claim 1, wherein based on the determined respective local minimum or minima a respective dead time of each of the diodes is ascertained on which the signals of the signal path used to ascertain the determined respective local minimum or minima was based, wherein the applied blocking voltage is controlled based on the respectively ascertained dead time.

10. The method according to claim 1, wherein one of the respective digital output signals of the digitizers is detected as a signal of the one or more signals of the signal path.

11. A photodetector, comprising:

one or more groups of single photon avalanche diodes, wherein a digitizer is connected downstream of each of the diodes;

a detection device configured to detect one or more signals of a signal path of the photodetector, the signal path including the diodes and the digitizers, with the same blocking voltage applied to the diodes;

an ascertainment device configured to ascertain a respective amplitude spectrum of each of the one or more detected signals, wherein the ascertainment device is configured to ascertain a respective local minimum of each of the ascertained amplitude spectrum; and a control device configured to control the applied blocking voltage based on the ascertained local minimum or minima.

12. A non-transitory machine-readable storage medium on which is stored a computer program for voltage stabilization of one or more groups of single photon avalanche diodes of a photodetector, wherein a digitizer is connected downstream of each of the diodes, the computer program, when executed by a computer, causing the computer to perform the following steps:

detecting one or more signals of a signal path of the photodetector, the signal path including the diodes and the digitizers, with the same blocking voltage applied to the diodes;

ascertaining a respective amplitude spectrum of each of the one or more detected signals;

ascertaining a respective local minimum of each of the ascertained respective amplitude spectrum of each of the one or more detected signals;

controlling the applied blocking voltage based on the ascertained respective local minimum or minima.

* * * * *